(12) United States Patent
Nakajima et al.

(10) Patent No.: US 6,431,783 B2
(45) Date of Patent: *Aug. 13, 2002

(54) OPTICAL FIBER CONNECTING STRUCTURE AND CONNECTING MEMBER FOR CONNECTING AN OPTICAL FIBER CABLE TO A FERRULE

(75) Inventors: Masahiro Nakajima; Hiroyuki Tokita; Junji Taira; Kouji Minami; Tatsuo Koshigoe, all of Tokyo; Nobuo Suzuki, deceased, late of Tokyo, all of (JP), by Sayoko Suzuki legal representative (73) Assignee: Seiko Instruments Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,482

(22) Filed: Feb. 26, 1998

(30) Foreign Application Priority Data

Feb. 27, 1997 (JP) ............................... 9-044371
Sep. 5, 1997 (JP) ............................... 9-241527

(51) Int. Cl.[7] ................................. H01R 9/05
(52) U.S. Cl. ................... 403/275; 439/585; 385/87; 174/73.1
(58) Field of Search ................ 385/86, 87, 76, 385/77, 78; 403/275, 281, 279, 274; 285/256; 174/135, 136, 84 C, 73.1, 74 R, 74 A; 439/585, 882, 879

(56) References Cited

U.S. PATENT DOCUMENTS

| | | | | |
|---|---|---|---|---|
| 3,227,993 A | * | 1/1966 | Bentley | 174/73.1 |
| 4,026,628 A | * | 5/1977 | Duffner et al. | 439/585 |
| 4,070,751 A | * | 1/1978 | Hogendobler et al. | 439/585 |
| 4,431,861 A | * | 2/1984 | Clabburn et al. | 174/73.1 |
| 4,447,121 A | * | 5/1984 | Cooper et al. | 385/87 |
| 5,052,774 A | * | 10/1991 | Bulman et al. | 385/86 |
| 5,101,463 A | * | 3/1992 | Cubukciyan et al. | 385/87 X |
| 5,222,169 A | * | 6/1993 | Chang et al. | 385/87 |
| 5,363,459 A | * | 11/1994 | Hultermans | 385/86 X |
| 5,390,272 A | * | 2/1995 | Repta | 385/87 X |
| 5,418,874 A | * | 5/1995 | Carlisle et al. | 385/87 X |
| 5,682,451 A | * | 10/1997 | Lee et al. | 385/78 |

FOREIGN PATENT DOCUMENTS

| | | | | |
|---|---|---|---|---|
| DE | 2236248 | * | 8/1980 | 174/73.1 |
| GB | 2040112 | * | 8/1980 | 174/73.1 |

* cited by examiner

Primary Examiner—Lynne H. Browne
Assistant Examiner—David E. Bochna
(74) Attorney, Agent, or Firm—Adams & Wilks (57) ABSTRACT

An optical fiber connector for connecting an optical fiber cable to a ferrule comprises a tubular body having a first end portion for connection to a peripheral surface of a ferrule, a second end portion for connection to a peripheral surface of an optical fiber cable, a step portion interconnecting the first end portion to the second end portion, and a clamping portion for clamping the optical fiber cable to the ferrule. The clamping portion extends inwardly from a terminal end of the second end portion towards the central axis of the tubular body but does not project lengthwise from the terminal end of the second end portion in the direction of the central axis. The first end portion, the second end portion, the step portion and the clamping portion of the tubular body have approximately the same wall thickness.

31 Claims, 6 Drawing Sheets

OPTICAL FIBER CONNECTING STRUCTURE AND CONNECTING MEMBER FOR CONNECTING AN OPTICAL FIBER CABLE TO A FERRULE

BACKGROUND OF THE INVENTION

The present invention relates to connecting members such as those used in optical connectors which are located between optical fiber transmission lines for switching, connecting or disconnecting the transmission lines and those directly fitted to ferrules, as well as to optical fiber connecting structures.

Presently, detachable optical connectors are used for connecting optical fiber cables and optical fiber cords intended for short-distance applications such as in-building wiring and wiring to equipment. Optical fibers are so thin and flexible that they are usually secured using ferrules. An optical connector is constructed of a plug incorporating a ferrule and an adaptor incorporating a sleeve.

Figure 6:
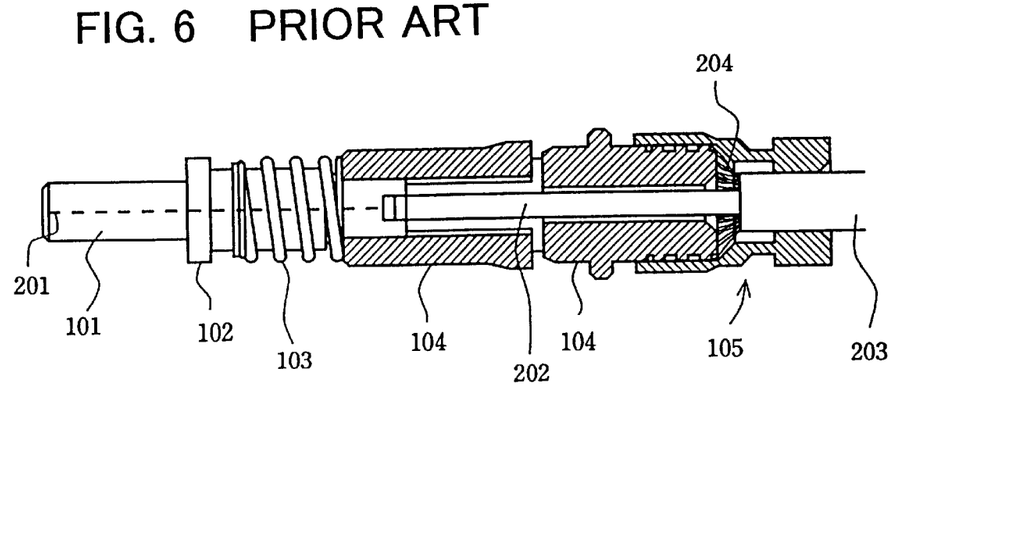
FIG. 6 is a cross-sectional view of an optical connector employing a crimp ring of the prior art.

FIG. 6 shows a cross section of an optical connector employing a conventional crimp ring. As shown in FIG. 6, a ferrule 101 in which an optical fiber 201 is inserted and fixed has a flange 102, and a stopper 104 is fitted behind a rear end portion of the ferrule 101 in the back of the flange 102 with a compression spring 103, which is mounted on the outer periphery of the rear end portion of the ferrule 101, placed in between. This means that the ferrule 101 is fitted in such a way that it can move relative to the stopper 104 in its axial direction with the aid of the compression spring 103. A coated optical fiber 202 is inserted into the compression spring 103 and the stopper 104 with a tensile strength member 204 of an optical fiber cable 203 located at the rear end of the stopper 104, and the tensile strength member 204 is secured around the outer periphery of a rear end portion of the stopper 104 by crimping a crimp ring 105.

Figure 7:
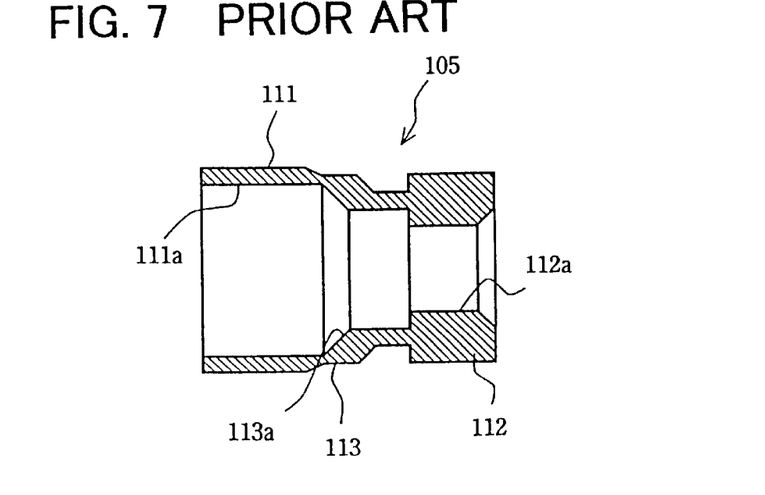
FIG. 7 is a cross-sectional view of the clamp ring of the prior art.

The crimp ring 105 is formed of a first cylindrical portion 111 whose inside diameter fits the outer periphery of the rear end portion of the stopper 104, a second cylindrical portion 112 which fits on the outer periphery of the optical fiber cable 203, and a connecting part 113 interconnecting the first and second cylindrical portion 111, 113, as shown in FIG. 7. The first cylindrical portion 111 is crimped to secure the tensile strength member 204 between an inside curved surface 111a of the first cylindrical portion 111 and the stopper 104 and, then, the second cylindrical portion 112 is crimped to firmly hold the optical fiber cable 203 in position with a compressive effect provided by an inside curved surface 112a of the second cylindrical portion 112.

Since the optical fiber cable 203 is held in position with compressive and frictional forces exerted by the inside curved surface 112a of the second cylindrical portion 112 of the crimp ring 105 as described above, its total securing force varies as a result of changes in the outside diameter of the optical fiber cable 203. It is therefore necessary to design the crimp ring 105 with varying inside diameters of the second cylindrical portion 112 to cater for such changes in the outside diameter of the optical fiber cable 203. In addition, the outside diameter of the second cylindrical portion 112 should be made suitable for diameter rating of a crimping tool to be used. Thus, one problem is that the crimp ring 105 is remarkably expensive, because it is conventionally produced by cutting an aluminum material, for instance. Another problem is that the second cylindrical portion 112 becomes relatively thick as a result of a relationship between the outside diameter of the optical fiber cable 203 and the diameter rating of the crimping tool, thereby requiring a great force in crimping operation.

This invention is intended to solve the foregoing problems in the conventional art; and has as an object the provision of clamp rings which are easy to crimp and manufacture.

Figure 8A:
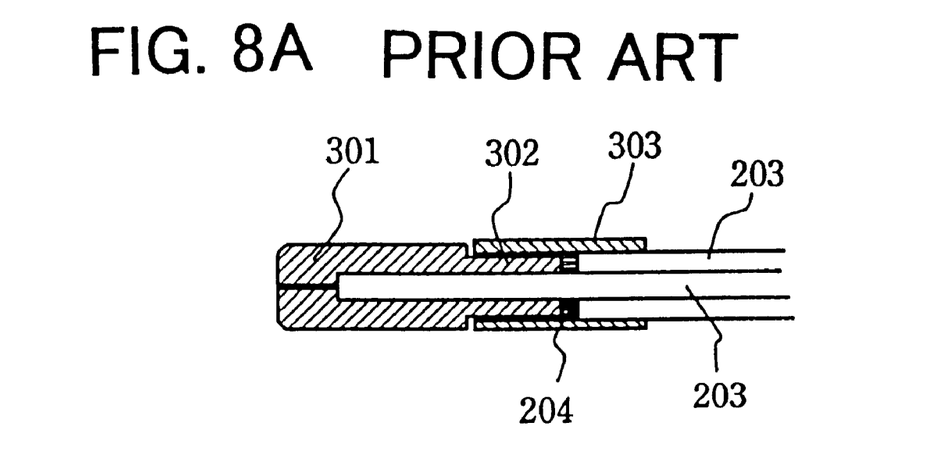
FIGS. 8A–8B are diagrams illustrating one example of an optical fiber fixing method using a clamp ring of the prior art.
Figure 8B:
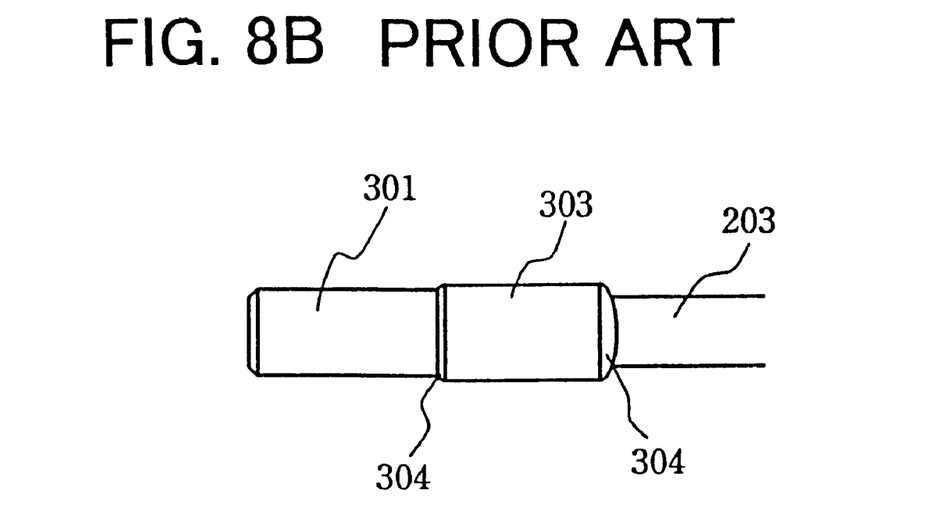

Also known in the prior art are structures for terminating optical fiber ends by directly fitting a ferrule to each end of an optical fiber cord. An example of such structures is shown in FIGS. 8A–8B. As shown in FIGS. 8A–8B, after inserting a coated optical fiber into a ferrule, a tensile strength member 204 of an optical fiber cable 203 is placed around the periphery 302 of a rear end portion of the ferrule 301, a ring member 303 is fitted, and both ends of the ring member 303 is fixed in position by an adhesive 304 to thereby secure the individual components in integral form.

Such conventional structure has such a problem that a sufficient tensile strength (about 10 kgf) can not be achieved since the tensile strength member 204 is fixed by using the adhesive 304.

Another problem of this conventional structure is that it increases the chance of fiber breakage. This is because the adhesive 304 is sucked into the tensile strength member 204 and that portion of the tensile strength member 204 where the adhesive 304 has been sucked looses flexibility.

The structure has yet another problem in that it requires a good deal of man hours for assembly work, because the adhesive 304 needs a long time to cure.

The invention aims at solving these problems. Accordingly, it is also an object of the invention to provide a structure which makes it possible to directly secure an optical fiber cable to a ferrule without using an adhesive, as well as an optical fiber terminating structure which provides a sufficient tensile strength without causing a loss of optical fiber cable flexibility, yet permitting ease of production.

SUMMARY OF THE INVENTION

In a first mode of carrying out the invention, a connecting member is provided for connecting a tensile strength member to the periphery of a rear end portion of a ferrule retaining part for holding a ferrule in which an optical fiber of an optical fiber cable incorporating a coated optical fiber and the tensile strength member surrounding the coated optical fiber is inserted and fixed with an outer covering of the optical fiber cable stripped off from its terminal portion. The connecting member comprises a first annular portion which fits on the periphery of the rear end portion of the ferrule retaining part, a second annular portion located in the back of the first annular portion, the second annular portion having a smaller diameter than the first annular portion, a step portion interconnecting the second annular portion and the first annular portion, and a clamping portion extending inward from the rear end of the second annular portion in such a way that the extreme end of the clamping portion secures the periphery of the optical fiber cable. The first annular portion, the second annular portion, the step portion and the clamping portion are formed as a single piece of metal having approximately the same wall thickness.

The connecting member of the invention preferably comprises a clamping ring and is formed by press-forming operation, for example.

In a second mode of carrying out the invention, an optical fiber connecting structure for connecting a tensile strength member to the periphery of a rear end portion of a ferrule, in which an optical fiber of an optical fiber cable incorporating a coated optical fiber and the tensile strength member surrounding the coated optical fiber is inserted and fixed with an outer covering of the optical fiber cable stripped off from its terminal portion, is characterized in that the tensile strength member is connected to the periphery of a rear end portion of the ferrule by crimping a connecting member with its one end fitted on the periphery of the rear end portion of the ferrule and the other end fitted on the periphery of the optical fiber cable.

In this structure, the connecting member preferably comprises a first annular portion which fits on the periphery of the rear end portion of the ferrule, a second annular portion located in the back of the first annular portion, the second annular portion having a smaller diameter than the first annular portion, a step portion interconnecting the second annular portion and the first annular portion, and a clamping portion extending inward from the rear end of the second annular portion in such a way that the extreme end of the clamping portion secures the periphery of the optical fiber cable. The first annular portion, the second annular portion, the step portion and the clamping portion are formed as a single piece of metal having approximately the same wall thickness.

Preferably, the periphery of the rear end portion of the ferrule is formed into a surface having pits and protrusions.

DETAILED DESCRIPTION OF THE PREFERRED EMBODIMENTS

Embodiments of the invention will now be described in detail with reference to the drawings.

Figure 1:
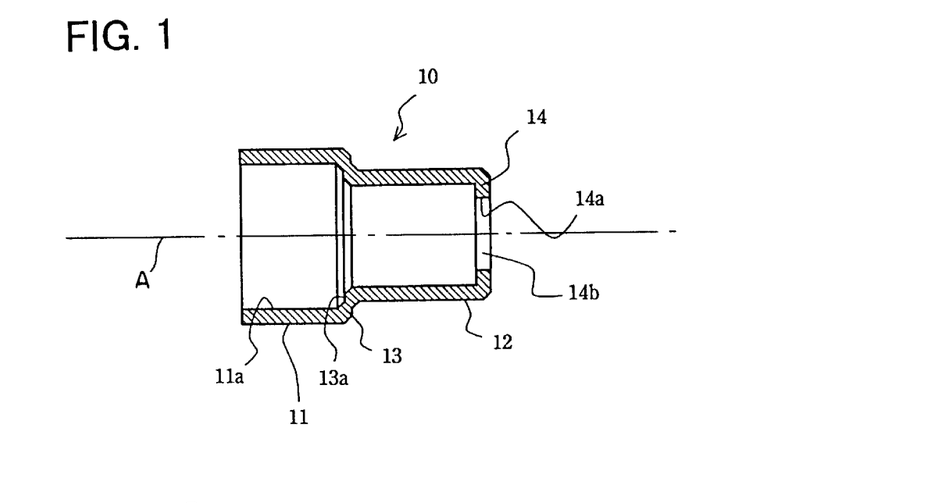
FIG. 1 is a cross-sectional view of a connecting member embodied as a clamp ring according to an embodiment of the invention.

FIG. 1 shows a cross section of a connecting member embodied as a clamp ring according to an embodiment of the invention. As shown in FIG. 1, the clamp ring 10 of this embodiment comprises a first annular portion 11, a second annular portion 12 having a smaller diameter than the first annular portion 11, a step portion 13 connecting the first annular portion 11 and the second annular portion 12 to each other, and a clamping portion 14 which is provided immediately adjacent to the rear end of the second annular portion 12 and extends inward, all these potions being formed as a single piece. The clamping portion 14 extends from the second annular portion 12 in a direction toward and generally perpendicular to a central axis A of the clamping ring 10. The inside diameter of an opening 14b formed by an end face 14a of the clamping portion 14 is made slightly larger than the outside diameter of the earlier mentioned optical fiber cable. The outside diameter of the second annular portion 12 is set to fit the diameter rating of a crimping tool to be used in the crimping operation. The first annular portion 11 has an inside diameter that fits a rear end portion of a stopper as described earlier, and is so constructed that a tensile strength member is secured between an inside curved surface 11a of the first annular portion 11 and an inside surface 13a of the step portion 13 when the first annular portion 11 is crimped from around its outer periphery.

Figure 2:
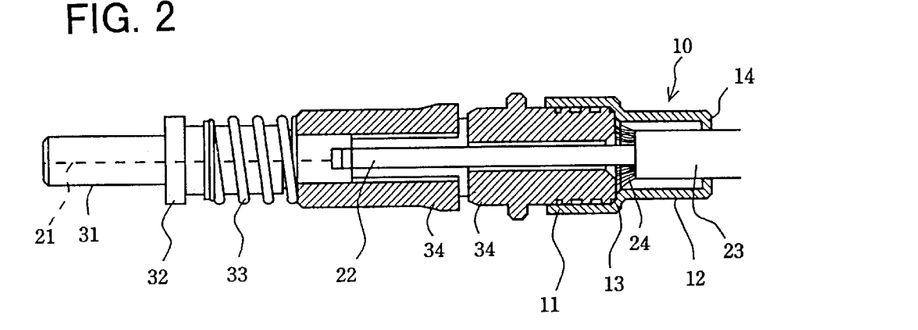
FIG. 2 is a cross-sectional view of an optical connector employing the clamp ring of the invention.

FIG. 2 shows a general construction diagram of an optical connector which employs the clamp ring of this embodiment. As shown in FIG. 2, a ferrule 31 in which an optical fiber 21 is inserted and fixed has a flange 32, and a stopper 34 is fitted behind a rear end portion of the ferrule 31 in the back of the flange 32 with a compression spring 33, which is mounted on the outer periphery of the rear end portion of the ferrule 31, placed in between. A coated optical fiber 22 is inserted into the compression spring 33 and the stopper 34 with a tensile strength member 24 of an optical fiber cable 23 located at the rear end of the stopper 34. The tensile strength member 24 is secured between the clamp ring 10 and an outer peripheral surface of the rear end portion of the stopper 34 by crimping.

As stated above, the inside diameter of the opening 14b formed by the end face 14a of the clamping portion 14 is slightly larger than the outside diameter of the above-mentioned optical fiber cable, and the outside diameter of the second annular portion 12 is set to fit the diameter rating of the crimping tool used in the crimping operation. An optical fiber cable 23 is clamped by the clamping portion 14 by crimping the second annular portion 12 with the crimping tool while the tensile strength member 24 is secured between the inside curved surface 11a of the first annular portion 11 and the stopper 34, and between the inside surface 13a of the step portion 13 and the stopper 34, by crimping the first annular portion.

The clamp ring 10 of this embodiment provides such advantageous effects that it can be produced extremely easily by press forming, for instance, and its crimping operation can be performed relatively easily.

Clamp rings of the invention and optical connectors employing the clamp rings are not limited to the above-described embodiment in their basic construction. For example, an optical connector may be a resin-molded product in which a flange, a compression spring and a stopper are integrally formed.

Figure 3A:
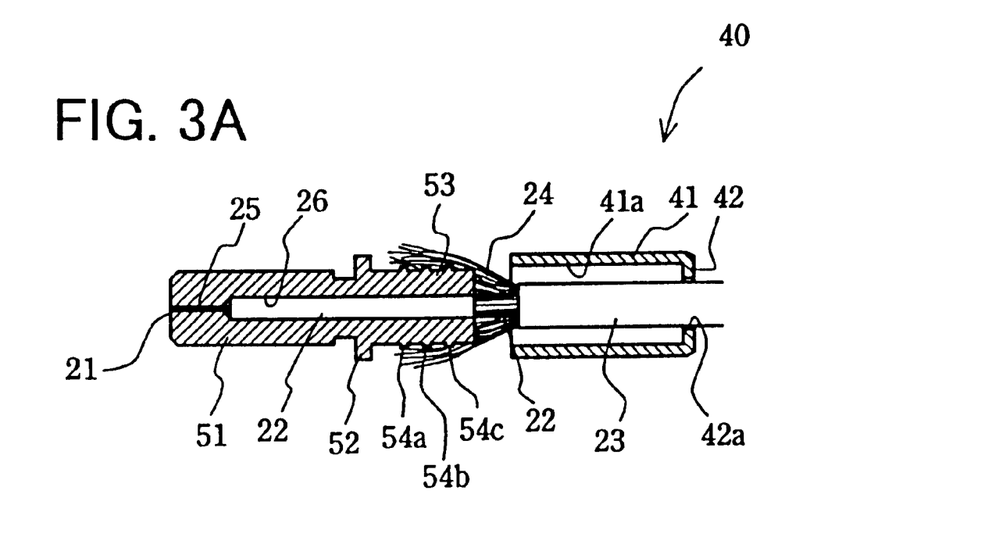
FIGS. 3A–3B are exploded cross-sectional diagrams showing an optical fiber terminating structure according to a second embodiment of the invention.
Figure 3B:
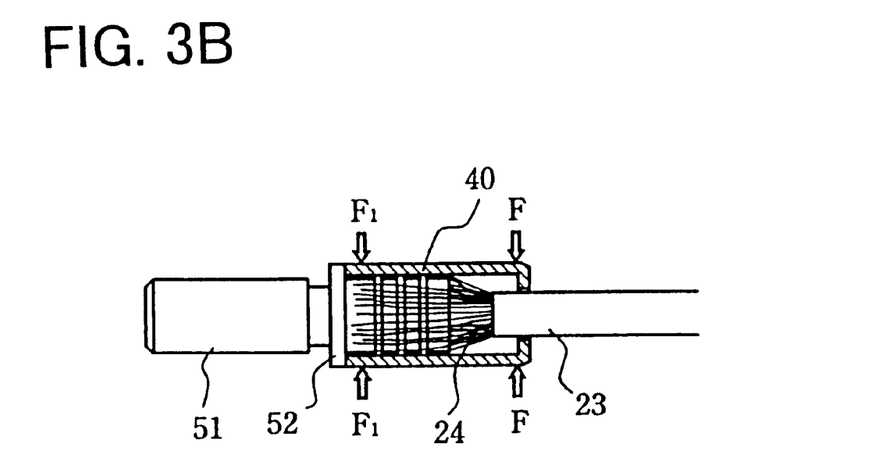

FIGS. 3A–3B show an optical fiber connecting structure according to a second embodiment of the invention. A clamp ring 40 used in this embodiment comprises a main annular portion 41 which fits on the outer periphery of a rear end portion of a ferrule and a clamping portion 42 which extends inward from the rear end of the main annular portion 41 and so that its innermost end clamps the outer periphery of an optical fiber cable 23. The main annular portion 41 and the clamping portion 42 are formed as a one-piece metallic part having approximately a uniform thickness.

The inside diameter of an opening 42a formed by the clamping portion 42 is made slightly larger than the outside diameter of the aforementioned optical fiber cable 23, and the outside diameter of the main annular portion 41 is set to fit the diameter rating of a crimping tool used in the crimping operation. Further, the inside diameter of the main annular portion 41 is made slightly larger than the diameter of the outer periphery 53 of the rear end portion of the ferrule 51 so that the tensile strength member 24 is secured between an inside curved surface 41a of the main annular portion 41 and the outer periphery 53 of the ferrule 51 to be joined by crimping both ends of the main annular portion 41 from around its outer periphery.

The ferrule 51 of this embodiment in which an optical fiber 21 is inserted and fixed has a flange 52, and the outer periphery 53 of the rear end portion of the ferrule 51 on which the aforementioned clamp ring 40 is fitted is located in the back of the flange 52. In this embodiment, three stepped ridges 54a–54c are integrally formed on the surface of the outer periphery 53.

It is understand that the flange 52 may be produced either as a discrete component of stainless steel, for instance, or as an integral part of the ferrule when producing it.

The following discussion deals with a procedure for making a terminating, structure in which the optical fiber cable 23 is connected to the ferrule 51 by using the aforementioned clamp ring 40.

As shown in FIG. 3A, the clamp ring 40 is first passed over the optical fiber cable 23, and an outer covering, or jacket, of the optical fiber cable 23 is removed near its end to expose the coated optical fiber 22, the tensile strength member 24 and the optical fiber 21. Then, the optical fiber 21 is inserted into an optical fiber insertion hole 25 of the ferrule 51 while the coated optical fiber 22 is inserted into a core insertion hole 26 of the ferrule 51. The optical fiber 21 and the coated optical fiber 22 are secured in position with an adhesive readily filled in the aforementioned optical fiber insertion hole 25 and the core insertion hole 26.

The tensile strength member 24 of the optical fiber cable 23 is located around the outer periphery 53 of the rear end portion of the ferrule 51 thus attached at this point. With the tensile strength member 24 disposed between the clamp ring 40 and the outer peripheral surface of the rear end portion of the ferrule 51 in the back of the flange 52, the clamp ring 40 is crimped and fixed by using the crimping tool as shown in FIG. 3(b). Thus, the tensile strength member 24 can be secured in position by crimping the ferrule side of the clamp ring 40, while the jacket (formed of PVC, for instance) of the optical fiber cable 23 can be secured by crimping the optical fiber cable side of the clamp ring 40.

Subsequently, the far end of the ferrule 51 is polished together with the optical fiber 21 to complete an optical fiber cable product already fitted with a ferrule, for instance.

As shown in the foregoing discussion, the present embodiment provides such advantageous effects that it becomes unnecessary to fix with the conventionally used adhesive, and the optical fiber cable 23 and the ferrule 51 can be joined together in an extremely simple and easy way, and the optical fiber cable does not loose its flexibility.

Tensile tests carried out on ferrules each joined to an optical fiber cable have proved that they could withstand tensile stresses of about 15 kgf. On the other hand, a structure employing the conventional adhesive bond disjoined under tensile stresses ranging from 3 to 4 kgf.

Although there are three stepped ridges 54 for clamping on the outer periphery 53 of the rear end portion of the ferrule 51 in this embodiment, the number of the stepped ridges 54 is not limited thereto in this invention. Moreover, the outer periphery 53 of the rear end portion of the ferrule 51 may feature small pits and protrusions on its surface (to form a so-called knurled surface) instead of forming the aforementioned stepped ridges so that the tensile strength member 24 is firmly retained by the small pits and protrusions when the clamp ring is fitted.

Figure 4:
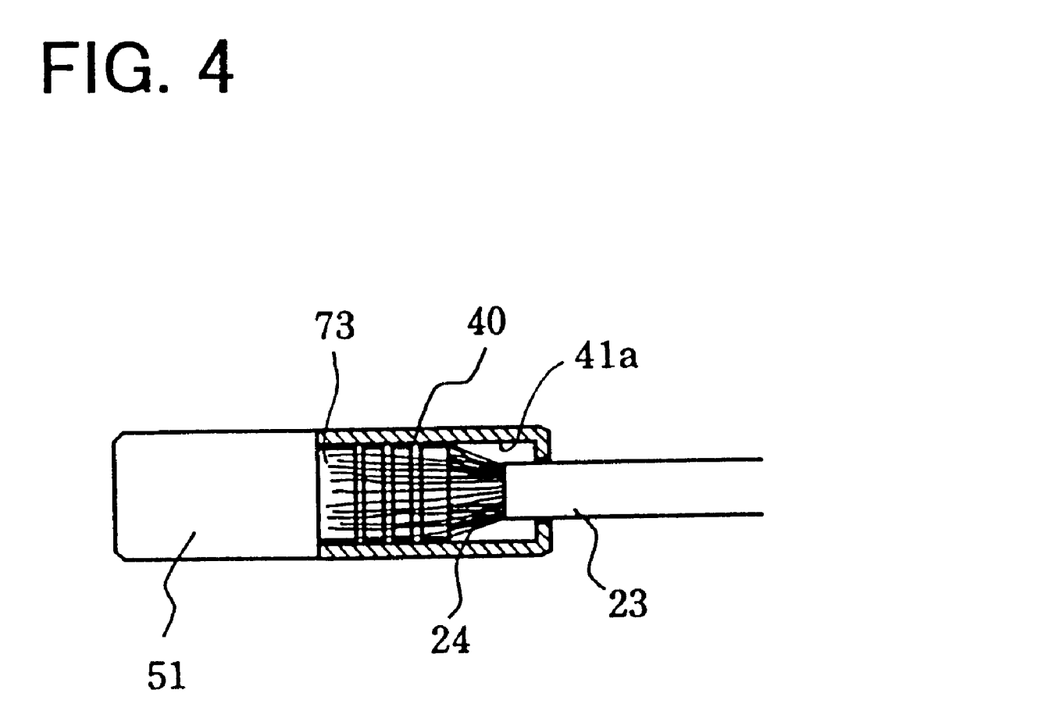
FIG. 4 is a diagram showing one variation of the optical fiber terminating structure according to the second embodiment of the invention.

Although the flange 52 is formed on the ferrule 51 in this embodiment, its structure may be varied by employing another type of clamp ring as shown in FIG. 4, in which the outer periphery of the clamp ring 40 and that of a ferrule 51 have the same diameter and an outer peripheral part 73 of the rear end portion of the ferrule 71 is made slightly smaller than an inside curved surface 41a of the clamp ring 40 in diameter so that the optical fiber cable and the ferrule would look like a one-piece element.

Figure 5A:
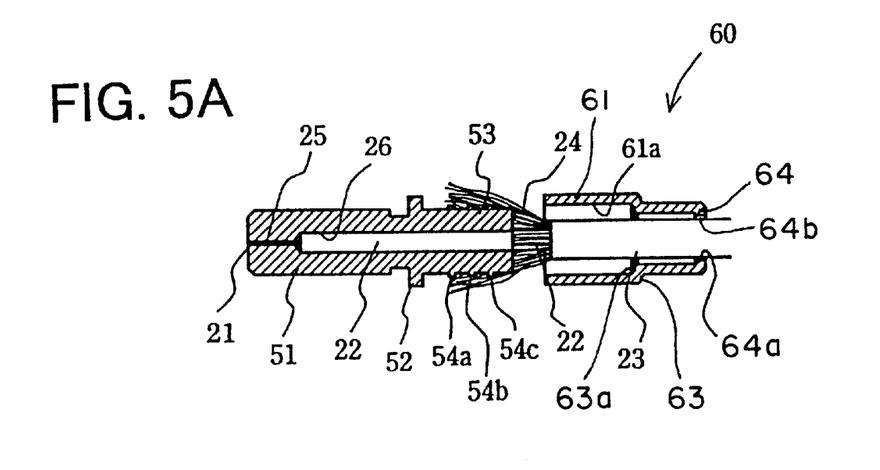
FIGS. 5A–5B are exploded cross-sectional diagrams showing an optical fiber terminating structure according to a third embodiment of the invention.
Figure 5B:
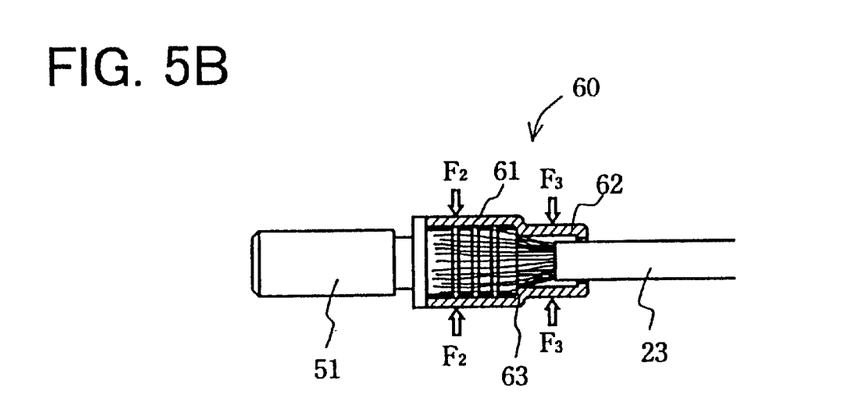

Next, FIGS. 5A–5B show an optical fiber terminating structure according to a third embodiment of the invention.

As shown in FIG. 5, a clamp ring 60 used in this embodiment comprises a first annular portion 61, a second annular portion 62 having a smaller diameter than the first annular portion 61, a step portion 63 connecting the first annular portion 61 and the second annular portion 62 to each other, and a clamping portion 64 which is provided immediately adjacent to the rear end of the second annular portion 62 and extends inward, all these potions being formed as a single piece, in a manner similar to the first embodiment shown in FIG. 1. The inside diameter of an opening 64b formed by an end face 64a of the clamping portion 64 is made slightly larger than the outside diameter of the earlier mentioned optical fiber cable. The outside diameter of the second annular portion 62 is set to fit the diameter rating of a crimping tool to be used in the crimping operation. Further, the diameter of the first annular portion 61 is made slightly larger than the diameter of the outer periphery 53 of the rear end portion of the ferrule 51 so that the tensile strength member 24 is secured between an inside curved surface 61a of the first annular portion 61 and the outer periphery 53 of the ferrule 51 to be joined by crimping both ends of the first annular portion 61 from around its outer periphery.

The optical fiber terminating structure of this embodiment is made by joining the optical fiber cable 23 to the ferrule 51 by using the clamp ring 60 in a manner similar to the second embodiment.

Specifically, the clamp ring 60 of this embodiment is passed over the optical fiber cable 23, the optical fiber 21 is inserted into the optical fiber insertion hole 25 of the ferrule 51, the coated optical fiber 22 is inserted into the core insertion hole 26 of the ferrule 51, and the optical fiber and the coated optical fiber 22 are secured in position with an adhesive, as shown in FIG. 5A.

The tensile strength member 24 of the optical fiber cable 23 located around the outer periphery 53 of the rear end portion of the ferrule 51 thus attached is disposed between the inside curved surface of the clamp ring 60 and the outer peripheral surface of the rear end portion of the ferrule 51 in the back of the flange 52, and the clamp ring 60 is crimped and fixed by using the crimping tool as shown in FIG. 5B. Thus, the tensile strength member 24 can be secured between the outer periphery 53 of the rear end portion of the ferrule 51 and the inside curved surface 61a of the first annular portion 61 by crimping the first annular portion 61 of the clamp ring 60 from around its outer peripheral surface. The tensile strength member 24 can also be secured between the outer periphery 53 of the rear end portion of the ferrule and an inside curved surface 63a of the step portion 63 to provide increased fixing strength by crimping the first annular portion 61 of the clamp ring 60 from around its outer peripheral surface. Furthermore, the jacket (formed of PVC, for instance) of the optical fiber cable 23 can be secured by clamping it by the end face 64a at the clamping portion 64.

As shown in the foregoing discussion, the present embodiment provides such advantages, as does the earlier-described embodiment, that it becomes unnecessary to fix with the conventionally used adhesive, the optical fiber cable 23 and the ferrule 51 can be joined together in an extremely simple and easy way, and the optical fiber cable does not loose its flexibility. This embodiment makes it possible to join the optical fiber to the ferrule even more firmly.

The clamp rings of the invention are easy to produce and their crimping operation can be performed relatively easily because they are formed to have approximately a uniform thickness throughout their whole structure and the outer periphery of the optical fiber cable is clamped by the end face of the clamping portion which extends inward from the rear end of the second annular portion as described above with reference to the embodiments.

Moreover, the optical fiber terminating structures of the invention provide such advantageous effects that they facilitate a fixing operation due to their construction in which the clamp rings have approximately a uniform thickness throughout and the tensile strength member is secured by crimping the clamp ring fitted over the outer periphery of the rear end portion of each ferrule, and that the number of processes and labor hours required for the fixing operation can be reduced since the individual components can be fixed together without using an adhesive, as required for unlike the conventional optical fiber terminating structures.

What is claimed is:

1. A clamp ring for clamping an optical fiber cable to an optical fiber connecting structure, the clamp ring comprising: a tubular body made of a single piece of material and having a first annular portion having a first diameter, a second annular portion having a second diameter smaller than the first diameter, a step portion interconnecting the first annular portion to the second annular portion, and a clamping portion for clamping an optical fiber cable to an optical fiber connecting structure, the clamping portion extending inwardly from a terminal end of the second annular portion towards the central axis of the tubular body but not projecting lengthwise from the terminal end of the second annular portion in the direction of the central axis; wherein the first annular portion, the second annular portion, the step portion and the clamping portion have approximately the same wall thickness.

2. A clamp ring according to claim 1; wherein the tubular body comprises a press-formed member.

3. A clamp ring according to claim 1; wherein the tubular body is made of metal.

4. An optical fiber connecting structure comprising: a clamp ring according to claim 1; a ferrule having a central hole extending therethrough; an optical fiber cable having the optical fiber extending into and connected to the central hole of the ferrule; a compression spring disposed on an outer periphery of a rear end portion of the ferrule; and a stopper disposed behind the rear end portion of the ferrule for engagement with the compression spring.

5. An optical fiber connecting structure according to claim 4 wherein the ferrule is mounted for undergoing movement relative to the stopper in an axial direction of the optical fiber.

6. An optical fiber connecting structure comprising: a clamp ring according to claim 1; a ferrule having a first end, a second end, a central hole extending therethrough and a flange disposed between the first and second ends; an optical fiber cable having the optical fiber extending into the central hole of the ferrule; a stopper disposed at the second end of the ferrule; and a compression spring disposed on an outer periphery of the ferrule between the flange and the second end.

7. An optical fiber connecting structure comprising: a ferrule having a central opening extending therethrough; an optical fiber cable having an optical fiber and a plurality of reinforcing members surrounding the optical fiber, the optical fiber extending into the central opening of the ferrule; and a clamp ring connecting the optical fiber cable to the ferrule, the clamp ring having a first end portion connected to a peripheral surface of an end portion of the ferrule, a second end portion connected to a peripheral surface of the optical fiber cable, and a clamping portion for clamping the optical fiber cable to the ferrule, the clamping portion extending inwardly from a terminal end of the second end portion towards the central axis of the clamp ring but not projecting lengthwise from the terminal end of the second end portion in the direction of the central axis; wherein the clamp ring comprises a tubular body made of a single piece of material and having the clamping portion, a first annular portion defining the first end portion, a second annular portion defining the second end portion, and a step portion interconnecting the second annular portion to the first annular portion; and wherein the first annular portion, the second annular portion, the step portion and the clamping portion have approximately the same wall thickness.

8. An optical fiber connecting structure according to claim 7; wherein the peripheral surface of the rear end portion of the ferrule has pits and protrusions.

9. An optical fiber connecting structure according to claim 7; wherein the first annular portion of the tubular body has a first diameter, and the second annular portion of the tubular body has a second diameter smaller than the first diameter.

10. An optical fiber connecting structure according to claim 7; wherein the tubular body is made of metal.

11. An optical fiber connecting structure according to claim 7; wherein the reinforcing members of the optical fiber cable are connected to the peripheral surface of the end portion of the ferrule.

12. An optical fiber connecting structure according to claim 7; wherein the second annular portion of the tubular body does not contact the peripheral surface of the optical fiber cable.

13. An optical fiber connecting structure according to claim 7; wherein the clamping portion of the tubular body extends from the second annular portion in a direction generally perpendicular thereto.

14. An optical fiber connecting structure comprising: a ferrule having a central hole extending therethrough; an optical fiber cable having an optical fiber and a plurality of reinforcing members surrounding the optical fiber, the optical fiber extending into the central hole of the ferrule; and a tubular body made of a single piece of material connecting the optical fiber cable to the ferrule, the tubular body having a first annular portion connected to a peripheral surface of an end portion of the ferrule, a second annular portion connected to but not contacting a peripheral surface of the optical fiber cable, a step portion interconnecting the first annular portion and the second annular portion, and a clamping portion for clamping the optical fiber cable to the ferrule, the clamping portion extending inwardly from a terminal end of the second annular portion towards the central axis of the tubular body but not projecting lengthwise from the terminal end of the second annular portion in the direction of the central axis; wherein the first annular portion, the second annular portion, the step portion and the clamping portion of the tubular body have approximately the same wall thickness.

15. An optical fiber connecting structure according to claim 14; wherein the tubular body is made of metal.

16. An optical fiber connecting structure according to claim 14; wherein the reinforcing members of the optical fiber cable are connected to the peripheral surface of the end portion of the ferrule.

17. An optical fiber connecting structure according to claim 14; wherein the reinforcing members are connected directly on the peripheral surface of the end portion of the ferrule.

18. An optical fiber connecting structure according to claim 14; wherein the first annular portion of the tubular body has a first diameter, and the second annular portion of the tubular body has a second diameter smaller than the first diameter.

19. An optical fiber connector for connecting an optical fiber cable to a ferrule, the optical fiber connector comprising: a tubular body having a first end portion for connection to a peripheral surface of a ferrule, a second end portion for connection to a peripheral surface of an optical fiber cable, a step portion interconnecting the first end portion to the second end portion, and a clamping portion for clamping the optical fiber cable to the ferrule, the clamping portion extending inwardly from a terminal end of the second end portion towards the central axis of the tubular body but not projecting lengthwise from the terminal end of the second end portion in the direction of the central axis; wherein the first end portion, the second end portion, the step portion and the clamping portion of the tubular body have approximately the same wall thickness.

20. An optical fiber connector according to claim 19; wherein the clamping portion of the tubular body extends from the second end portion in a direction generally perpendicular thereto.

21. An optical fiber connector according to claim 19; wherein the tubular body is made of metal.

22. An optical fiber connector according to claim 19; wherein the first end portion of the tubular body has a first diameter, and the second end portion of the tubular body has a second diameter smaller than the first diameter.

23. An optical fiber connector according to claim 19; wherein the first and second end portions of the tubular body are generally annular-shaped.

24. An optical fiber connector according to claim 19; wherein the tubular body comprises a press-formed member.

25. An optical fiber connecting structure comprising: an optical connector having a ferrule having a central hole extending therethrough, a compression spring disposed on an outer periphery of a rear end portion of the ferrule, and a stopper disposed behind the rear end portion of the ferrule; an optical fiber cable having an optical fiber and plurality of reinforcing members surrounding the optical fiber, the optical fiber extending into the central hole of the ferrule; and a tubular body made of a single piece of material connecting the optical fiber cable to the ferrule, the tubular body having a first annular portion connected to a peripheral surface of an end portion of the optical connector, a second annular portion connected to the optical fiber cable, a step portion interconnecting the first annular portion and the second annular portion, and a clamping portion for clamping the optical fiber cable to the optical connector, the clamping portion extending inwardly from a terminal end of the second annular portion towards the central axis of the tubular body but not projecting lengthwise from the terminal end of the second annular portion in the direction of the central axis.

26. A clamp ring for clamping an optical fiber cable to an optical fiber connecting structure, the clamp ring comprising: a tubular body having a central axis, a first annular portion, a second annular portion, a step portion interconnecting the first annular portion to the second annular portion, and a clamping portion for clamping an optical fiber cable to an optical fiber connecting structure, the clamping portion extending inwardly from a terminal end of the second annular portion towards the central axis but not projecting lengthwise from the terminal end of the second annular portion in the direction of the central axis.

27. A clamp ring according to claim 26; wherein the tubular body is made of a single piece of material.

28. A clamp ring according to claim 26; wherein the first annular portion has a first diameter and the second annular portion has a second diameter smaller than the first diameter.

29. A clamp ring according to claim 26; wherein the first annular portion, the second annular portion, the step portion and the clamping portion have approximately the same wall thickness.

30. An optical fiber connecting structure comprising: an optical connector having a ferrule having a central hole extending therethrough; an optical fiber cable having an optical fiber and a plurality of reinforcing members surrounding the optical fiber, the optical fiber extending into the central hole of the ferrule; and a tubular body made of a single piece of material connecting the optical fiber cable to the ferrule, the tubular body having a first annular portion connected to a peripheral surface of an end portion of the optical connector, a second annular portion connected to the optical fiber cable, a step portion interconnecting the first annular portion and the second annular portion, and a clamping portion for clamping the optical fiber cable to the optical connector, the clamping portion extending inwardly from a terminal end of the second annular portion towards the central axis of the tubular body but not projecting lengthwise from the terminal end of the second annular portion in the direction of the central axis.

31. An optical fiber connecting structure according to claim 30; wherein the optical connector has a compression spring disposed on an outer periphery of a rear end portion of the ferrule and a stopper disposed behind a rear end portion of the ferrule so that the ferrule undergoes movement relative to the stopper in an axial direction of the optical connector.

* * * * *